United States Patent
Wu et al.

(10) Patent No.: US 8,627,384 B2
(45) Date of Patent: Jan. 7, 2014

(54) COMMUNICATION DEVICE AND RECONFIMETHOD AND APPARATUS FOR HIGH DEFINITION VIDEO WIRELESS TRANSMISSION

(75) Inventors: Tung-Yu Wu, Hsinchu (TW); Yu-Shen Chou, Taipei (TW); Ching-Yao Huang, Hsinchu (TW)

(73) Assignee: Acer Incorporated, Taipei Hsien (TW)

( * ) Notice: Subject to any disclaimer, the term of this patent is extended or adjusted under 35 U.S.C. 154(b) by 0 days.

(21) Appl. No.: 13/494,352

(22) Filed: Jun. 12, 2012

(65) Prior Publication Data
US 2013/0036445 A1 Feb. 7, 2013

(30) Foreign Application Priority Data
Aug. 5, 2011 (TW) .............................. 100127914 A

(51) Int. Cl.
*H04N 7/18* (2006.01)
*H04J 3/14* (2006.01)
*H04J 1/16* (2006.01)
*H04H 20/28* (2008.01)
*H04B 7/216* (2006.01)
*H04N 7/173* (2011.01)

(52) U.S. Cl.
USPC ............. 725/81; 725/118; 370/235; 370/252; 370/486; 370/335

(58) Field of Classification Search
None
See application file for complete search history.

(56) References Cited

U.S. PATENT DOCUMENTS

| | | | | |
|---|---|---|---|---|
| 5,867,230 | A * | 2/1999 | Wang et al. | 348/425.2 |
| 6,480,497 | B1 * | 11/2002 | Flammer et al. | 370/400 |
| 2004/0223471 | A1 * | 11/2004 | Panchal et al. | 370/335 |
| 2008/0279210 | A1 * | 11/2008 | Naka et al. | 370/448 |
| 2010/0316163 | A1 * | 12/2010 | Forenza et al. | 375/296 |

FOREIGN PATENT DOCUMENTS

| | | | | |
|---|---|---|---|---|
| JP | 01183270 | A * | 7/1989 | H04N 1/32 |
| WO | 2011087905 | A1 | 7/2011 | |

OTHER PUBLICATIONS

Search report of EP application dated May 31, 2013.
Tung-Yu Wu et al., "Optimal transmission of high definition video transmission in WiMedia systems", Wireless Networks; The Journal of Mobile Communication, Computation and Information, Kluwer Academic Publishers, Do, vol. 17, No. 2, (2010) 291-303.
S. Krishnamachari et al., "Adaptive cross-layer protection strategies for robust scalable video transmission over 802.11 wlans", IEEE Journal on Selected Areas in Communications, IEEE Service Center, Piscataway, US, vol. 21, No. 10, (2003) 1752-1763.
B. Girod et al., "Cross-layer design of ad hoc networks for real-time video streaming", IEEE Wireless Communications, IEEE Service Center, Piscataway, NJ, US, vol. 12, No. 4, (2005) 59-65.

* cited by examiner

*Primary Examiner* — Jason J Chung
*Assistant Examiner* — William J Kim
(74) *Attorney, Agent, or Firm* — McClure, Qualey & Rodack, LLP

(57) ABSTRACT

A High Definition (HD) video wireless transmission method for transmitting a data packet for a video frame of an HD video is provided. The method includes: receiving the video frame which comprises a video frame size; acquiring a payload length and a Minimal Required Transmission Time (MRTT) associated with the video frame, wherein the MRTT is a minimal time bound for transmitting the video frame to a receiving end; performing partitioning to the video frame for acquiring the data packet according to the payload length; and performing scheduling to the data packet according to the MRTT, and the scheduled data packet is transmitted to the receiving end.

6 Claims, 6 Drawing Sheets

COMMUNICATION DEVICE AND RECONFIMETHOD AND APPARATUS FOR HIGH DEFINITION VIDEO WIRELESS TRANSMISSION

CROSS REFERENCE TO RELATED APPLICATIONS

This application claims priority of Taiwan Patent Application No. 100127914, filed on Aug. 5, 2011, the entirety of which is incorporated by reference herein.

BACKGROUND OF THE INVENTION

1. Field of the Invention

The disclosure is related to high definition (HD) video wireless transmission, and, more particularly to systems and methods that can schedule and partition the data packet of high definition video in a media access control (MAC) layer.

2. Description of the Related Art

Compared with standard definition video, high definition video is a higher resolution video, such as 1280×720 pixel or 1920×1080 pixel. A high definition video wireless transmission is used to display a high definition digital video disc (HD DVD), blue-ray disc (BD), high definition internet protocol television (HD IPTV) set-top box, or high definition movie projection. A high definition video wireless transmission resolves the problems of a traditional wire transmission apparatus, such as lack of motion, an expensive high definition multimedia interface (HDMI) transmission line and inability to support many users.

At present, the proportion of high definition television use in homes has increased more and more. A plurality of users can watch high definition video in different high definition televisions at the same time and mitigate the problem of configuring the high definition multimedia interface transmission line via a high definition internet protocol television set-top box. FIG. 1 is schematic diagram illustrating a communication model 100 at home. The communication model 100 comprises a plurality of high definition televisions 102 and a wireless high definition internet protocol television set-top box 104. The wireless high definition internet protocol television set-top box 104 can transmit high definition video to each of the plurality of high definition televisions 102 respectively by using all kinds of video frame formats such as non-compressed data or compressed data formats, and different antenna technologies such as a single input single output (SISO) or multiple input multiple output (MIMO) antenna technology, and different compression methods such as JPEG2000 or MPEG methods.

For a high definition video wireless transmission, the packet error and the arrival time of every video frame at the receiving end (high definition television 102) will affect viewing quality. Finite frequency bandwidth may affect the frame error rate and the arrival time of every video frame in a receiving end (high definition television 102). The conventional high definition video wireless transmission method uses a restricted packet error rate method and an optimum throughput method to process high definition video wireless transmission. For the restricted packet error rate method, the payload length of packets is shortened to decrease the packet error rate (e.g. the packet error rate is restricted to below $10^{-2}$). But, adding the overhead information leads to more time required for transmission. For the optimum throughput method, because high definition video wireless transmission requires high data transmission rates, the payload length of packets is increased to increase the effective throughput at the same time. Although the average transmission time is the shortest transmission time in the optimum throughput method, the increased payload length of packets results in increased packet error rates.

BRIEF SUMMARY OF THE INVENTION

Intelligent data management systems and methods are provided to overcome the above mentioned problems.

An embodiment of the invention provides a high definition video wireless transmission method for transmitting a data packet for a video frame of a high definition video. First, the video frame is received. A payload length and a Minimum Required Transmission Time related to the video frame are acquired, wherein the Minimum Required Transmission Time is a minimum time bound for transmitting the video frame to a receiving end. The video frame is divided to acquire the data packet according to the payload length. At last, the data packet is scheduled according to the Minimum Required Transmission Time, and the scheduled data packet is transmitted to the receiving end.

An embodiment of the invention provides a high definition video wireless transmission apparatus for transmitting a data packet for a video frame of a high definition video comprising: a video stream module configured to receive the video frame; a medium access control (MAC) control module configured to acquire a payload length and a Minimum Required Transmission Time related to the video frame, wherein the Minimum Required Transmission Time is a minimum time bound for transmitting the video frame to a receiving end; a packetization unit configured to divide the video frame for acquiring the data packet according to the payload length; and a scheduler configured to schedule the data packet according to the Minimum Required Transmission Time, wherein the scheduled data packet is outputted to a physical layer for transmission to the receiving end.

BRIEF DESCRIPTION OF THE DRAWINGS

The invention will become more fully understood by referring to the following detailed description with reference to the accompanying drawings, wherein.

DETAILED DESCRIPTION OF THE INVENTION

As the above described, for high definition video wireless transmission, the packet error and the arrival time of every video frame at the receiving end (high definition television 102) will affect viewing quality. Therefore, the desired payload length is adjusted appropriately according to the instant channel condition, and the video frame error is adjusted by the retransmission mechanism (e.g. I-ACK) in MAC layer. The compressed and non-compressed high definition video can perform wireless transmissions in a shorter frequency bandwidth, utilizing Ultra Wideband (UWB) technology, or WiFi (11n) technology via the method and apparatus of the high definition video wireless transmission of the invention.

Generally speaking, if the playing time of a high definition video is 120 minutes, 30-60 video frames will be displayed per minute. The desired frame error rate is a target frame error rate such that the high definition video is displayed without video frame error for 120 minutes. For example, if the playing time of a high definition video is 120 minutes, the target frame error rate is about $10^{-6}$. The video frame error can be adjusted by the retransmission mechanism in a MAC layer. In addition, the receiving end (e.g. high definition television 102) can receive video frames continuously in order to maintain the quality of the high definition video. Therefore, the arrival time of every video frame at the receiving end (e.g. high definition television 102) can be estimated at the sending end (e.g. wireless high definition internet protocol television set-top box 104), and the sending end performs scheduling to avoid delay of the video frame at the receiving end according to the arrival time of every video frame at the receiving end. The method of high definition video wireless transmission in the invention can satisfy the delay constraint. If the frame rate of the high definition video wireless transmission is 30 video frames per second, and the decoder buffer of the receiving end only allows temporary storage of a video frame, the delay constraint is equal to the time for the next video frame to be transmitted to the decoder buffer of the receiving end per 1/30 second. If the delay constraint can't be satisfied, video frame error will happen.

Figure 1:
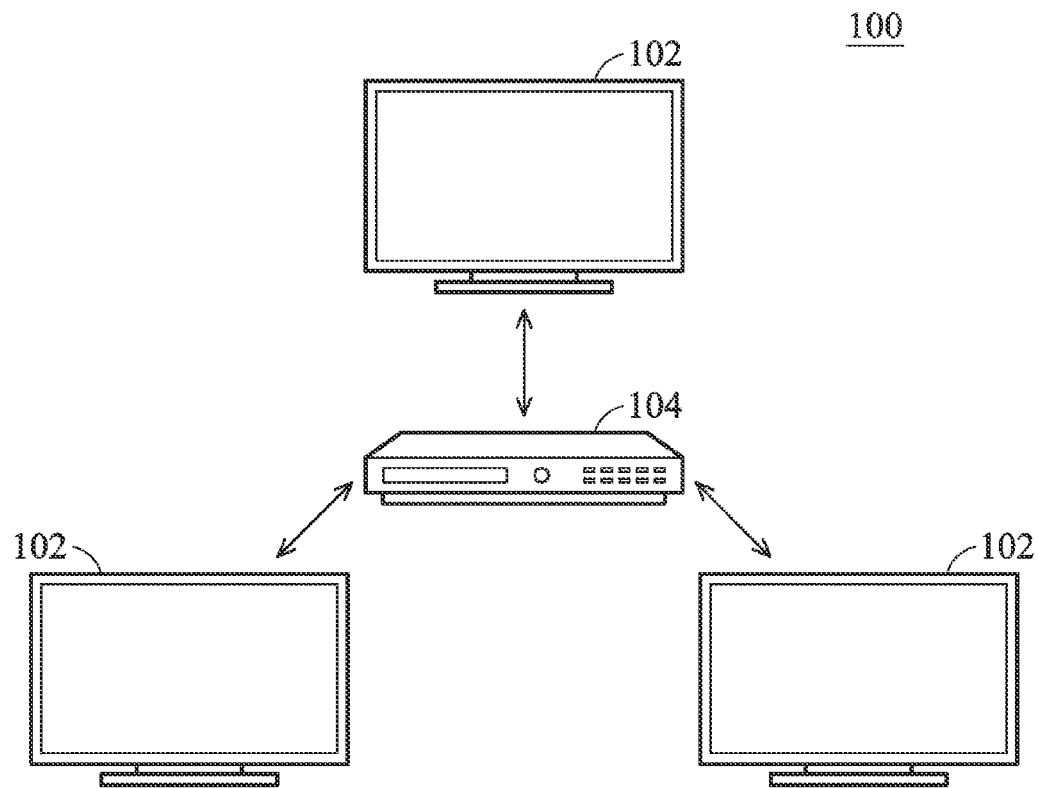
FIG. 1 is schematic diagram illustrating a communication model 100 at home.
Figure 2:
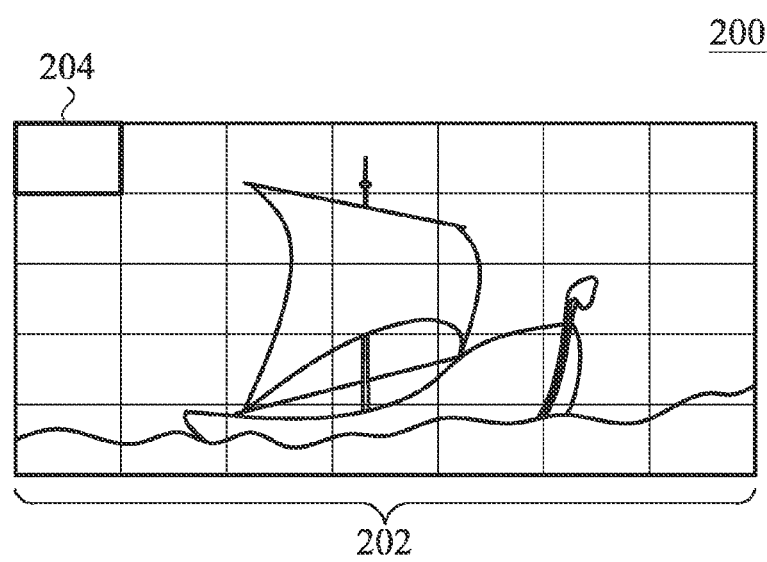
FIG. 2 is schematic diagram 200 illustrating a divided video frame.

FIG. 2 is schematic diagram 200 illustrating a divided video frame. The schematic diagram 200 comprises a video frame 202 and plurality of divided blocks 204 of the video frame 202. As the above describes, the frame rate of the high definition video wireless transmission is 30 video frames per second such that 30 video frames 202 per second are transmitted. The sending end (e.g. wireless high definition internet protocol television set-top box 104) can divide the video frame 202 into a plurality of blocks 204, and then package the plurality of blocks 204 in the packet and transmit the packet to the receiving end (e.g. high definition television 102).

In order to resolve the problem of the prior art, an embodiment of the invention provides a method of high definition video wireless transmission. The method of high definition video wireless transmission can satisfy the requirement of a target frame error rate (e.g. $10^{-6}$). Specifically speaking, the method of high definition video wireless transmission in an embodiment of the invention defines a Required Transmission Time (RTT). The Required Transmission Time (RTT) is a time bound for transmitting a video frame, and the Required Transmission Time (RTT) can satisfy the requirement of the target frame error rate (e.g. $10^{-6}$). The method of high definition video wireless transmission in the invention not only provide the Required Transmission Time (RTT) but adjust the payload length of the packet of the video frame and the Modulation and Coding Scheme (MCS) for every video frame as a result of acquiring the Minimum Required Transmission Time (MRTT). The Minimum Required Transmission Time (MRTT) is a minimum time bound for transmitting the video frame.

Figure 3:
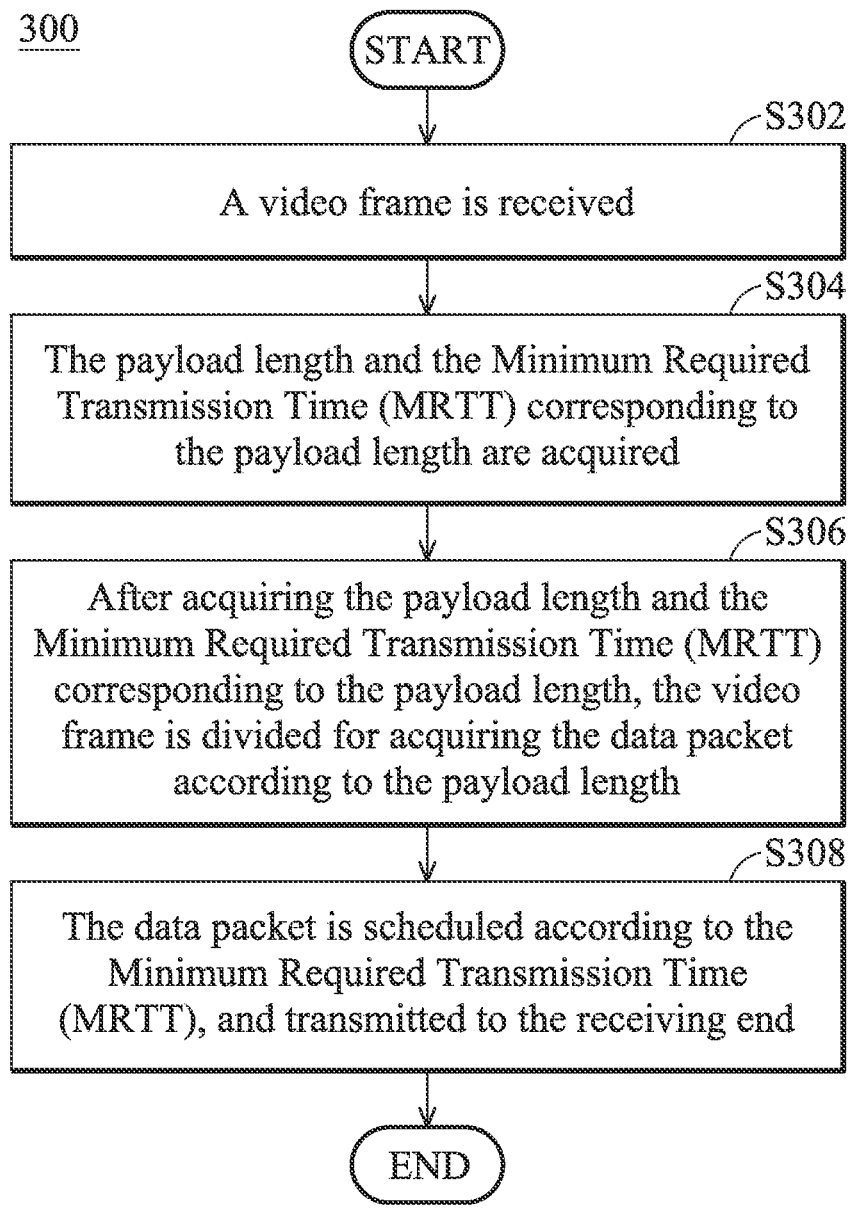
FIG. 3 is a flowchart 300 of the high definition video wireless transmission method according to an embodiment of the invention.

FIG. 3 is a flowchart 300 of the high definition video wireless transmission method according to an embodiment of the invention. Firstly, in step S302, a video frame is received, wherein the video frame comprises a size (e.g. 0.5 Mb~0.3 Mb). In step S304, the payload length and the Minimum Required Transmission Time (MRTT) corresponding to the payload length are acquired. In step S306, after acquiring the payload length and the Minimum Required Transmission Time (MRTT) corresponding to the payload length, the video frame is divided for acquiring the data packet according to the payload length. In step S308, at last, the data packet is scheduled according to the Minimum Required Transmission Time (MRTT), and transmitted to the receiving end.

Specifically speaking, the Minimum Required Transmission Time (MRTT) in the invention can be performed according to the equation (1) as follow:

$$\min_{L,m} N_R(L) \times T(L, m) \qquad \text{Equation (1)}$$

and satisfy the conditions as follow:

$$\sum_{i}^{N_F-1} \binom{N_R}{i} P(\gamma_s, L, m)^i \times (1 - P(\gamma_s, L, m))^{N_R-i} \leq P_e$$

$$N_F(L) = \frac{D}{8L}$$

$$L \geq 0$$

where
D=video frame size (bits);
$\gamma_s$=signal to noise ratio (SNR);
L=payload length (bytes);
m=Modulation and Coding Scheme (MCS);
Pe=target frame error rate;
T( )=time of transmitting a packet, including overhead;
NF=number of the packets divided from a video frame; and
NR=number of the packets for transmitting a video frame, including the retransmission part.

In addition, the equation (1) can be transformed to the function of the payload (L) and the Modulation and Coding Scheme (m) by a binomial cumulative distribution function (CDF) approximation and the equation (1) can be simplified as equation (2):

Min $\qquad$ Equation (2)

$$\left\{ \left[ \left(\frac{D}{8L}\right) - 1 \right] + \frac{\left(e - \sqrt{\left(4*\left(\frac{D}{8L}\right)-1\right)*(1-(1-p)^{CL})}\right)^2}{4*(1-p)^{CL}} + \frac{1}{4} \right\} * \left\{ \frac{8L}{R(m)} + O_t(m) \right\}$$

where
p=symbol error rate;
R( )=data rate (bps);
$O_t$( )=overhead message (seconds);

e=constant corresponding to the target frame error rate; and

C=constant.

Figure 4:
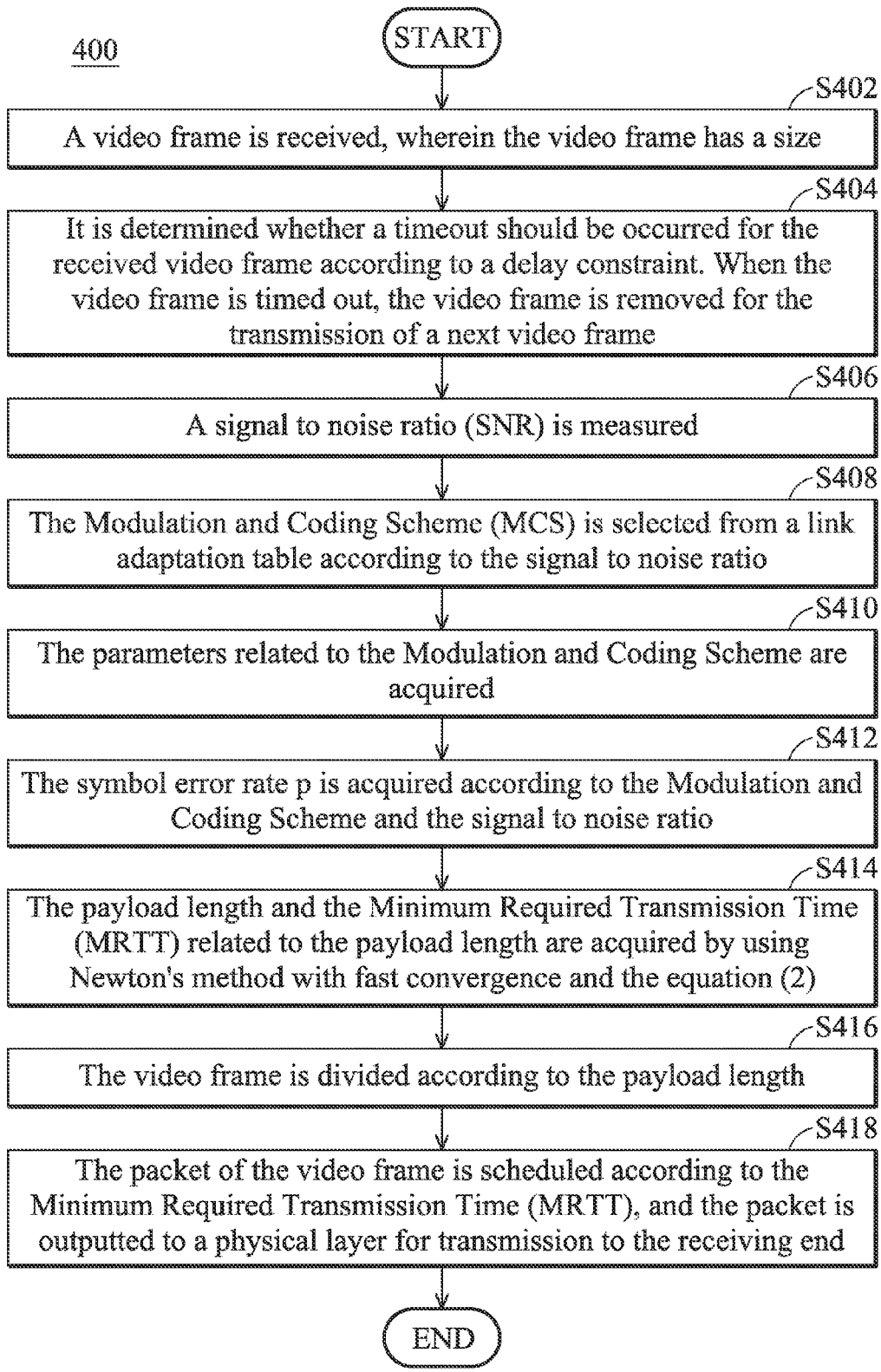
FIG. 4 is a flowchart 400 of the high definition video wireless transmission method according to an embodiment of the invention.

FIG. 4 is a flowchart 400 of the high definition video wireless transmission method according to an embodiment of the invention. Firstly, in step S402, a video frame is received, wherein the video frame comprises a size (e.g. 0.5 Mb~0.3 Mb). Specifically speaking, in step S404, it is determined whether a timeout should be occurred for the received video frame according to a delay constraint (e.g. the next video frame will be transmitted to the decoder buffer of the receiving end per 1/30 second). When the video frame is timed out, the video frame is removed for the transmission of a next video frame. Next, in step S406, a signal to noise ratio (SNR) is measured. It is noted that, the signal to noise ratio can be measured by a lot of methods. In an embodiment, the signal to noise ratio can be measured, when a video frame is received or during a unit of time (e.g. 1/s or 1/ns). The signal to noise ratio can be stored temporarily for wireless transmissions when it used to execute the high definition video. In addition, the signal to noise ratio can be stored temporarily in a store device for reading, wherein the store device comprises a volatile memory and/or non-volatile memory. In step S408, after acquiring the signal to noise ratio, the Modulation and Coding Scheme (MCS) is selected from a link adaptation table according to the signal to noise ratio. For example, the Modulation and Coding Scheme (MCS) for transmitting a less redundant bit is selected, when the signal to noise ratio is better, and the Modulation and Coding Scheme (MCS) for transmitting a more redundant bit is selected, when the signal to noise ratio is worse. The link adaptation table is a pre-defined conversion table, and when the signal to noise ratio is acquired, the pre-defined Modulation and Coding Scheme (MCS) can be acquired directly from the link adaptation table.

Next, in step S410 the parameters related to the Modulation and Coding Scheme are acquired, wherein the parameters comprise an overhead message $O_r(m)$, data rate R(m) related to the Modulation and Coding Scheme and constant C. In step S412, the symbol error rate p is acquired according to the Modulation and Coding Scheme and the signal to noise ratio, wherein the symbol error rate p didn't pass the channel coding, and if the symbol error rate p passes the convolution code, the symbol error rate p will mean the first event error rate. In step 414, the payload length and the Minimum Required Transmission Time (MRTT) related to the payload length are acquired by using Newton's method with fast convergence and the equation (2). The Minimum Required Transmission Time (MRTT) is a time bound for transmitting the video frame and can satisfy the requirement of the target frame error rate. The payload length can be the length of a packet of the video frame that transmitted to the decoder buffer in the Minimum Required Transmission Time (MRTT). In step 416, after acquiring the payload length and the Minimum Required Transmission Time (MRTT), the video frame is divided according to the payload length. Last, in step 418, the packet of the video frame is scheduled according to the Minimum Required Transmission Time (MRTT), and the scheduled packet is outputted to a physical layer for transmission to the receiving end.

Figure 5:
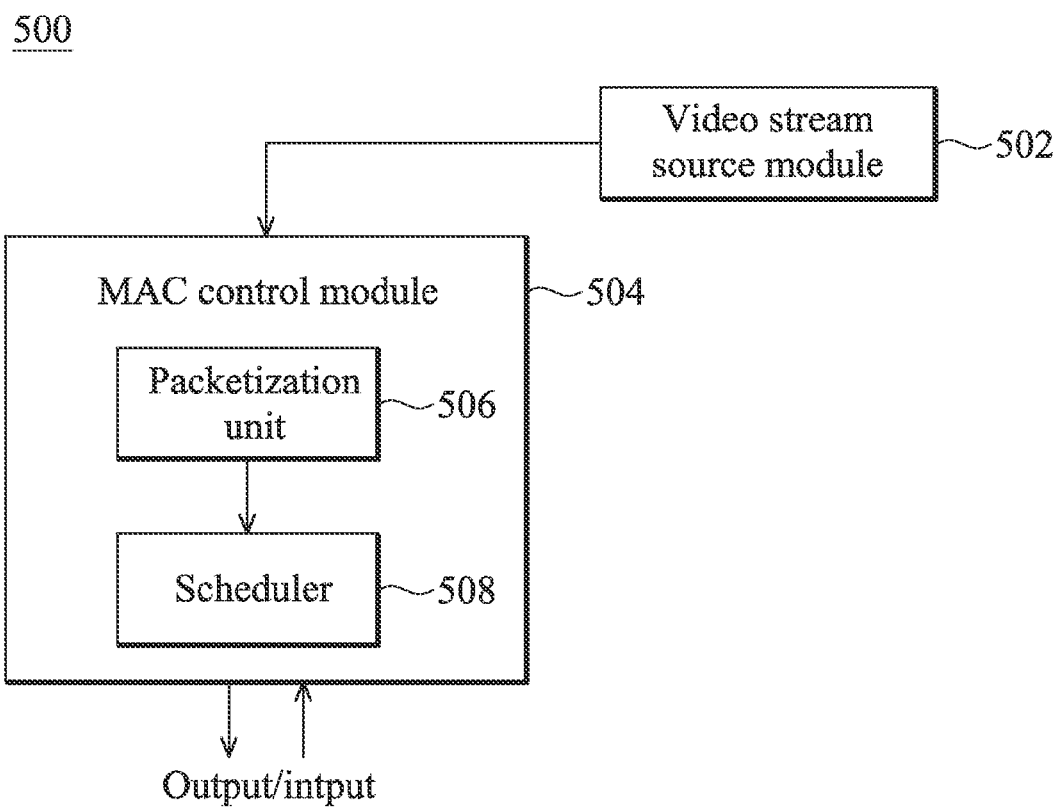
FIG. 5 is schematic diagram of the high definition video wireless transmission apparatus 500 according to an embodiment of the invention.

FIG. 5 is schematic diagram of the high definition video wireless transmission apparatus 500 according to an embodiment of the invention. It is noted that, FIG. 5 only applies to the device related to the high definition video wireless transmission, and other devices not related to the high definition video wireless transmission which are understood by those who are skilled in this technology are not described in detail. A high definition video wireless transmission apparatus 500 comprises a video stream source module 502 and a MAC control module 504. The MAC control module 504 further comprises a packetization unit 506 and a scheduler 508.

The video stream source module 502 can receive a video frame. For example, the video stream source module 502 can read a high definition video source by a high definition digital video disc, blue-ray disc or cable television, and transmit the high definition video source to the MAC control module 504, wherein the video frame has a video frame size (e.g. 0.5 Mb~3 Mb). The MAC control module 504 can be used to acquire a payload length and a Minimum Required Transmission Time related to the video frame, wherein the Minimum Required Transmission Time is a minimum time bound for transmitting the video frame to a receiving end. The packetization unit 506 in the MAC control module 504 can divide the video frame for acquiring the data packet of the video frame according to the payload length. The scheduler 508 in the MAC control module 504 can then schedule the data packet of the video frame according to the Minimum Required Transmission Time (MRTT), and output the scheduled data packet to physical layer for transmission to the receiving end.

Figure 6:
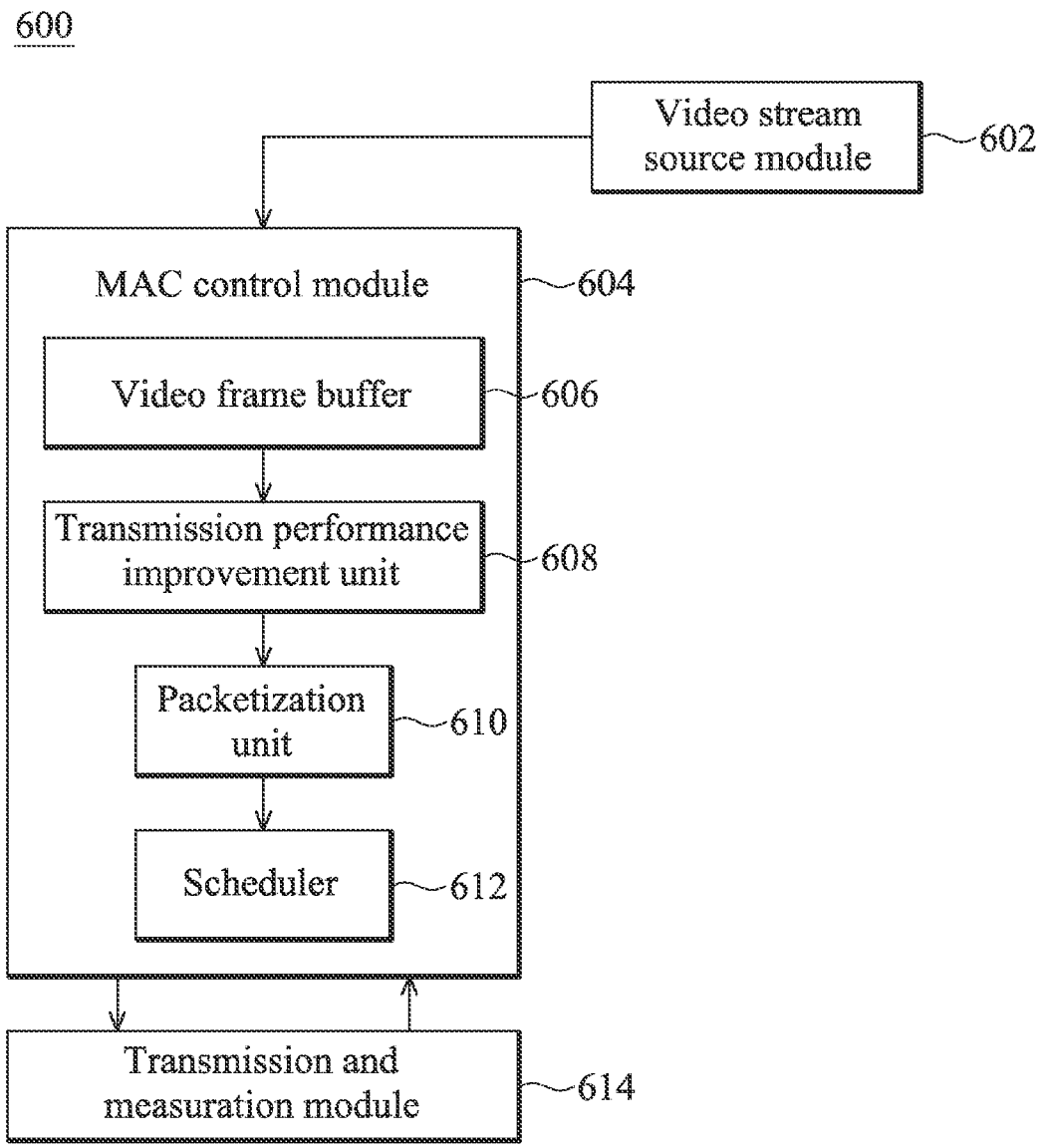
FIG. 6 is schematic diagram of the high definition video wireless transmission apparatus 600 according to an embodiment of the invention.

FIG. 6 is schematic diagram of a high definition video wireless transmission apparatus 600 according to an embodiment of the invention. It is noted that, FIG. 6 only applies to the device related to the high definition video wireless transmission, and other devices not related to the high definition video wireless transmission which are understood by those who are skilled in this technology are not described in detail. A high definition video wireless transmission apparatus 600 comprises a video stream source module 602, a MAC control module 604 and a transmission and measurement module 614. The MAC control module 604 further comprises a video frame buffer 606, a transmission performance improvement unit 608, a packetization unit 610 and a scheduler 612. The transmission and measurement module 614 can be used to transmit the packet of the high definition video wirelessly and calculate the signal to noise ratio (SNR) in the physical layer. The transmission and measurement module 614 can comprise the wireless transmission device such as an antenna, wireless analog baseband unit, analog to digital converter, modulator, demodulator, encoder and decoder. The transmission and measurement module 614 can measure a signal to noise ratio (SNR), wherein the signal to noise ratio (SNR) can be measured through many methods. In an embodiment, the transmission and measurement module 614 can receive the control message from the MAC control module 604 and measure the signal to noise ratio (SNR) when receiving a video frame. In another embodiment, the transmission and measurement module 614 can measure the signal to noise ratio (SNR) per unit time (e.g. 1/s and 1/ns). The signal to noise ratio (SNR) can be returned back to the MAC control module 604 for temporary storage of a high definition video in a wireless transmission and stored in a storage device (not presented in FIG. 6) for providing the MAC control module 604 for reading, wherein the storage device can comprise volatile memory and/or non-volatile memory.

The video stream source module 602 can receive a video frame. For example, the video stream source module 602 can read a high definition video source by a high definition digital video disc, blue-ray disc or cable television and transmit the high definition video source to the MAC control module 604, wherein the video frame comprises a video frame size (e.g. 0.5 Mb~3 Mb). The video frame buffer 606 in the MAC control module 604 can determine whether the received video frame is timed out according to a delay constraint (e.g. the next video frame will be transmitted to the decoder buffer of the receiving end per 1/30 second) and remove the video frame for the transmission of a next video frame when the video frame is timed out. The transmission performance improvement unit 608 can select the Modulation and Coding Scheme (MCS) from a link adaptation table according to the signal to noise ratio measured by the transmission and measurement module 614. The link adaptation table is a pre-defined conversion table, and when the signal to noise ratio is acquired, the pre-defined Modulation and Coding Scheme (MCS) can be acquired directly from the link adaptation table. In addition, the transmission performance improvement unit 608 can acquire the parameters according to the signal to noise ratio (SNR) and the Modulation and Coding Scheme (MCS), wherein the parameters comprise an overhead message $O_r(m)$, data rate $R(m)$ related to the Modulation and Coding Scheme (MCS), and constant C and the symbol error rate p is acquired according to the Modulation and Coding Scheme and the signal to noise ratio, wherein the symbol error rate p didn't pass the channel coding. The transmission performance improvement unit 608 can acquire the payload length and the Minimum Required Transmission Time (MRTT) related to the payload length by using Newton's method with fast convergence and the equation (2), wherein the Minimum Required Transmission Time (MRTT) is a time bound for transmitting the video frame satisfying the requirement of the target frame error rate. The payload length determines the payload length of the packet when the video frame is transmitted to the decoder buffer in the Minimum Required Transmission Time (MRTT). The transmission performance improvement unit 608 can transmit the payload length and the Minimum Required Transmission Time (MRTT) to the packetization unit 610 and the scheduler 612 for dividing, packaging, and scheduling the packet in the MAC layer. The packetization unit 610 can divide the video frame and package it in a packer according to the payload length acquired by the transmission performance improvement unit 608. The scheduler 612 can make a schedule according to the Minimum Required Transmission Time (MRTT). The transmission and measurement module 614 can execute the modulation and coding of the packet generated by the packetization unit 610 in a physical layer and transmit the packet to the receiving end according to the schedule of the scheduler 612 and Modulation and Coding Scheme (MCS).

Figure 7:
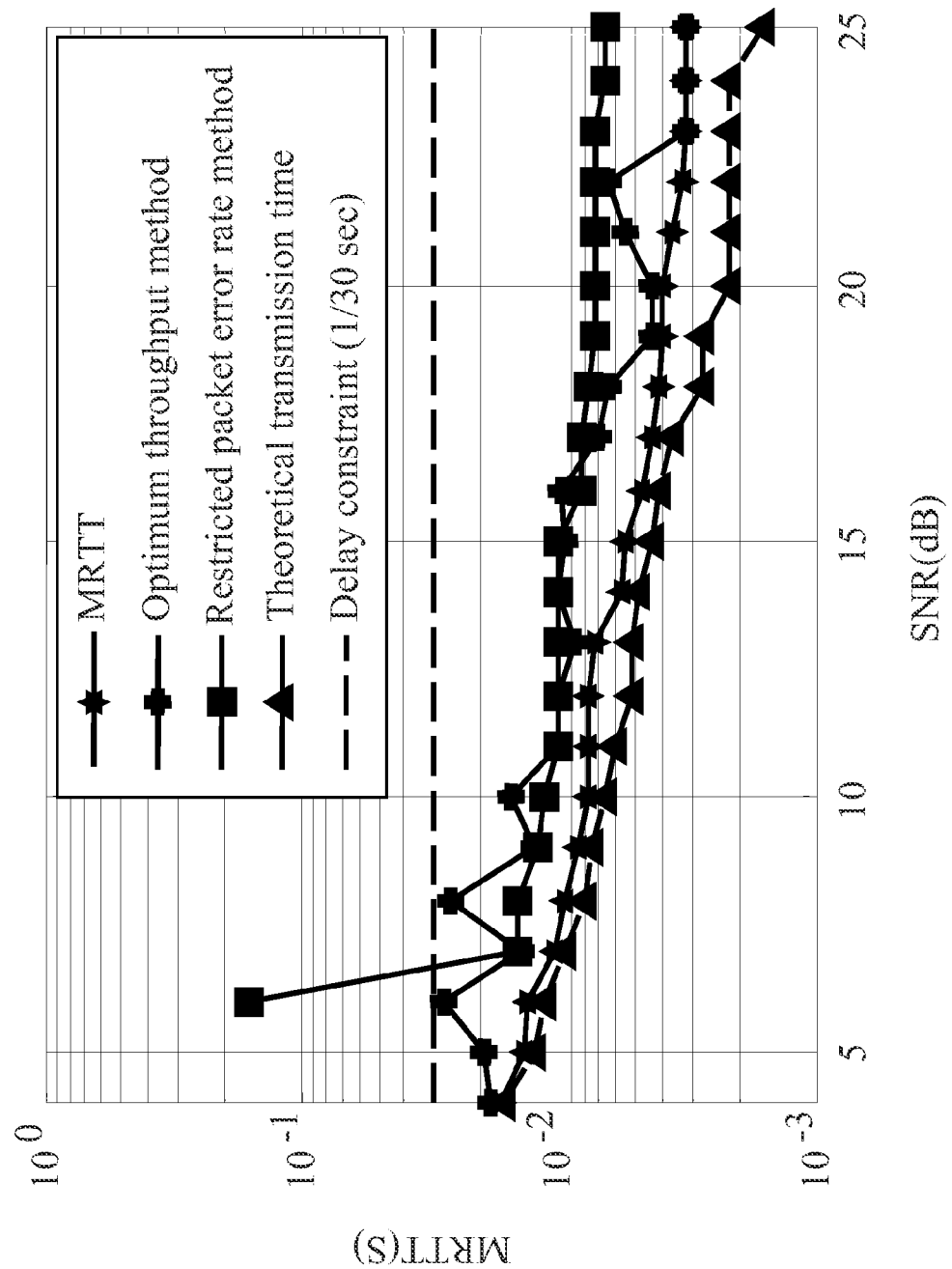
FIG. 7 is a curve diagram of the Minimum Required Transmission Time (MRTT) corresponding to the different signal to noise ratios (SNR) in the high definition video wireless transmission method and the prior art according to an embodiment of the invention.

FIG. 7 is a curve diagram of the Minimum Required Transmission Time (MRTT) corresponding to the different signal to noise ratios (SNR) in the high definition video wireless transmission method and the prior art according to an embodiment of the invention. The high definition video wireless transmission method in an embodiment of the invention uses the concept of the Minimum Required Transmission Time (MRTT), and the prior art uses the restricted packet error rate method and the optimum throughput method. In the restricted packet error rate method, the payload length of the packet is shortened to decrease the packet error rate (e.g. the packet error rate is restricted below $10^{-2}$). However, adding the overhead information leads to more time required for transmission and lost data packets when the signal to noise ratio (SNR) is low and does not satisfy the requirement of the delay constraint. When the restricted packet error rate method doesn't satisfy the requirement of the delay constraint, the decoder buffer at the receiving end can't process real-time decoding and generate the video frame error. In the optimum throughput method, because high definition video wireless transmission requires a high data transmission rate, the payload length of a packet is increased, which increases the effective throughput at the same time. Although the average transmission time is the shortest average transmission time in the optimum throughput method, the increased payload length of packets result in increased packet error rates. Similarly, the optimum throughput method causes data packets to be lost and the video frame generates error because that it doesn't satisfy the delay constraint. The method of high definition video wireless transmission in the invention can satisfy the requirement of the target frame error rate (e.g. $10^{-6}$). An embodiment of the invention defines a Required Transmission Time (RTT). The Required Transmission Time (RTT) is a time bound for transmitting a video frame, and the Required Transmission Time (RTT) can satisfy the requirement of the target frame error rate (e.g. $10^{-6}$). The method of high definition video wireless transmission in the invention adjusts the payload length of the packet of the video frame and the Modulation and Coding Scheme (MCS) for every video frame as a result of acquiring the Minimum Required Transmission Time (MRTT), and then divides the packet and schedules the packets according to the Minimum Required Transmission Time (MRTT). As presented in FIG. 7, the invention overcomes the constraints of the prior art. When the condition of the wireless environment worsens, the invention can satisfy the requirement of the delay constraint without video frame errors, and transmit the packet of the video frame by the Minimum Required Transmission Time (MRTT), thus providing more users for viewing high definition video using a finite bandwidth.

The above paragraphs describe many aspects. Obviously, the teaching of the invention can be accomplished by many methods, and any specific configurations or functions in the disclosed embodiments only present a representative condition. Those who are skilled in this technology can understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A high definition video wireless transmission method for transmitting a data packet for a video frame of a high definition video, comprising:
    receiving the video frame;
    acquiring a payload length and a Minimum Required Transmission Time related to the video frame, wherein the Minimum Required Transmission Time is a minimum time bound for transmitting the video frame to a receiving end, and the Minimum Required Transmission Time satisfies the requirement of a target frame error rate, wherein the target frame error rate is a frame error rate when displaying the high definition video without a video frame error, and wherein the video frame comprises a video frame size, and the step of acquiring the Minimum Required Transmission Time comprises:
    adjusting the payload length and a Modulation and Coding Scheme according to the video frame size and a signal to noise ratio, wherein the Modulation and Coding Scheme is acquired from a conversion table according to the signal to noise ratio;
    acquiring the Minimum Required Transmission Time and the payload length according to an equation as follows:

$$\text{Min}\left\{\left[\left(\frac{D}{8L}\right)-1\right]+\frac{\left(e-\sqrt{\left(4*\left(\frac{D}{8L}\right)-1\right)*(1-(1-p)^{CL})}\right)^2}{4*(1-p)^{CL}}+\frac{1}{4}\right\}*$$

$$\left\{\frac{8L}{R(m)}+O_t(m)\right\};$$

wherein D is the video frame size, L is the payload length, e is a function corresponding to the target frame error rate, p is a symbol error rate, C is a constant, R(m) is a data rate and $O_t(m)$ is an overhead message;

dividing the video frame for acquiring the data packet according to the payload length;

scheduling the data packet according to the Minimum Required Transmission Time; and transmitting the scheduled data packet to the receiving end.

2. The method of claim 1, wherein the symbol error rate is acquired according to the signal to noise ratio and the Modulation and Coding Scheme.

3. The method of claim 1, further comprising:

determining whether the received video frame is timed out according to a delay constraint; and removing the video frame when the video frame is timed out.

4. A high definition video wireless transmission apparatus for transmitting a data packet for a video frame of a high definition video, comprising:

a video stream module, configured to receive the video frame; and a medium access control (MAC) control module, configured to receive the video frame from the video stream module and acquire a payload length and a Minimum Required Transmission Time related to the video frame, wherein the Minimum Required Transmission Time is a minimum time bound for transmitting the video frame to a receiving end, and the Minimum Required Transmission Time satisfies the requirement of a target frame error rate, wherein the target frame error rate is a frame error rate when displaying the high definition video without a video frame error, wherein the video frame comprises a video frame size, and the medium access control (MAC) control module acquires the Minimum Required Transmission Time by adjusting the payload length and a Modulation and Coding Scheme according to the video frame size and a signal to noise ratio;

wherein the medium access control (MAC) control module acquires the Modulation and Coding Scheme from a conversion table according to the signal to noise ratio; and wherein the medium access control (MAC) control module acquires the Minimum Required Transmission Time and the payload length according to an equation as follows:

$$\text{Min}\left\{\left[\left(\frac{D}{8L}\right)-1\right]+\frac{\left(e-\sqrt{\left(4*\left(\frac{D}{8L}\right)-1\right)*(1-(1-p)^{CL})}\right)^2}{4*(1-p)^{CL}}+\frac{1}{4}\right\}*$$

$$\left\{\frac{8L}{R(m)}+O_t(m)\right\};$$

wherein D is the video frame size, L is the payload length, e is a function corresponding to the target frame error rate, p is a symbol error rate, C is a constant, R(m) is a data rate and $O_t(m)$ is an overhead message;

wherein the medium access control (MAC) control module further comprise:

a packetization unit, configured to divide the video frame for acquiring the data packet according to the payload length; and a scheduler, configured to schedule the data packet according to the Minimum Required Transmission Time, wherein the scheduled data packet is outputted to a physical layer for transmission to the receiving end.

5. The high definition video wireless transmission apparatus of claim 4, wherein the symbol error rate is acquired according to the signal to noise ratio and the Modulation and Coding Scheme.

6. The high definition video wireless transmission apparatus of claim 4, the medium access control (MAC) control module further comprising:

a video frame buffer, configured to determine whether the received video frame is timed out according to a delay constraint, wherein the video frame is removed when the video frame is timed out.

* * * * *

UNITED STATES PATENT AND TRADEMARK OFFICE
CERTIFICATE OF CORRECTION

PATENT NO. : 8,627,384 B2  
APPLICATION NO. : 13/494352  
DATED : January 7, 2014  
INVENTOR(S) : Wu et al.

Page 1 of 1

It is certified that error appears in the above-identified patent and that said Letters Patent is hereby corrected as shown below:

Title page, item [54] and in the Specification, Col. 1, the title should be "Method and Apparatus for High Definition Video Wireless Transmission"

Signed and Sealed this  
Fourth Day of March, 2014

Michelle K. Lee  
*Deputy Director of the United States Patent and Trademark Office*